United States Patent [19]

Gullett et al.

[11] Patent Number: 4,676,821
[45] Date of Patent: Jun. 30, 1987

[54] SULFUR-COATED UREA

[75] Inventors: Larry L. Gullett, Florence; Charles L. Simmons, Tuscumbia, both of Ala.

[73] Assignee: Tennessee Valley Authority, Muscle Shoals, Ala.

[21] Appl. No.: 942,565

[22] Filed: Dec. 12, 1986

[51] Int. Cl.$^4$ ............................................. C05C 9/00
[52] U.S. Cl. ...................................... 71/28; 71/64.07; 71/64.12; 71/64.13; 564/3; 564/32; 564/63
[58] Field of Search ................. 71/64.07, 64.12, 64.13, 71/27, 28; 564/3, 32, 63

[56]  References Cited
U.S. PATENT DOCUMENTS 4,042,366  8/1977  Fersch et al. ................... 71/64.12 X
4,326,875  4/1982  Young ............................. 71/64.12 X
4,330,319  5/1982  Bexton et al. ................... 71/64.13 X
4,587,358  5/1986  Blouin ...................................... 564/3

Primary Examiner—Ferris H. Lander
Attorney, Agent, or Firm—Robert A. Petrusek

[57] ABSTRACT

The present invention teaches a technique and provides for apparatus eminently useful for reducing the amount of sulfur currently needed by industry to coat water-soluble fertilizer materials such as, for example, granular or prilled urea. A further advantage of and benefits derived from the practice of the instant invention relates to the production of sulfur-coated urea products which have substantially higher nitrogen values than do urea products produced by prior art processes.

16 Claims, 2 Drawing Figures

IMPROVED SULFUR-COATED UREA

IMPROVED SULFUR-COATED UREA

DISSOLUTION RATE vs TOTAL COATING

SULFUR-COATED UREA

The invention herein described may be manufactured and used by and for the Government for governmental purposes without the payment to us of any royalty therefor.

INTRODUCTION

The present invention relates to new, novel, relatively simple and inexpensive, as well as highly economically attractive improvements in the area of producing and utilizing certain types of particulate fertilizer material whereupon to the surfaces of the individual particles thereof, an improved resulting coating of sulfur is applied.

The application of coatings of sulfur to normally water-soluble fertilizer pellets, such as for example, granular or prilled urea, is practiced by many artisans in the fertilizer industry in order to provide for the control of the dissolution rate of the nutrient values of the resulting fertilizer after application of same to the intended soil environment, as for example in the instance of the subsequent distribution of such materials to the field. As disclosed in the teachings of U.S. Pat. No. 3,295,950, Blouin et al., Jan. 3, 1967, assigned to the assignee of the present invention, the benefits of such controlled dissolution rate are manyfold and include decreased loss of nutrient values by the action of percolating irrigation or rain water and coincident soil leaching, lower seedling and sprout damage, minimization of luxury consumption by the plant, and decreased nutrient loss normally resulting from decomposition of certain types of fertilizer materials to the gaseous phase. This latter benefit refers mainly to the nitrogen losses normally associated with the decomposition of urea after it is either surface applied or incorporated into a dry soil environment. Additional benefits derived from the practice of sulfur-coating fertilizer include such considerations as follows—at least a portion of the sulfur is available for plant nutrition, and prolonged release of nitrogen, a major nutrient therein, eliminates the need for repeated applications of fertilizer, especially those including the principal plant nutrient nitrogen, later in the growing season. Sulfur coating of urea has thusly become a current standard commercial practice in the art for effecting the production of controlled-release nitrogen fertilizer.

BACKGROUND OF THE INVENTION

1. Field of the Invention

The present invention relates to improved methods and means for effecting the production of sulfur-coated urea, and includes substantial improvements therein whereby substantially less sulfur needs to be utilized in the coating thereof than is taught to be utilized in the many processes disclosed in the prior art and yet there is achieved in the practice of the instant invention the same desirable low dissolution rate of the resulting urea as is achieved in the practice of even the best presently available art. It will be appreciated by those skilled in this art that the method of the present invention thusly results in significant cost benefits in the commercial production of sulfur-coated urea. It will also become readily apparent to those skilled in this art that still another benefit derived by the practice of the instant invention is that the resulting coated products contain substantially less sulfur for a given dissolution rate and thereby result in economically more attractive materials having higher nitrogen contents. Conversely, if desired, levels of sulfur coating now practiced by industry may be used in the practice of the instant invention to thereby yield sulfur-coated urea products demonstrating dissolution rates vastly lower than those that can be achieved by such presently best available art.

A principal consideration relating to the practice of the instant invention is the selection and use of methods and/or means wherein the modus operandi comprises the use of, as substrate material, granular or prilled urea that has been previously conditioned with calcium lignosulfonate.

2. Description of the Prior Art

At the present time, because of the state of the art developed in view of and in response to certain considerations supra, there are available a number of methods and means which utilize in one way or another a plethora of approaches for applying coatings of sulfur to urea for purposes of achieving controlled dissolution rates in the resulting product. It is generally agreed that at least one of the earliest and most economically attractive, as well as technologically sound of these was that originally revealed by Blouin et al. in the parent application, now abandoned, of U.S. Pat. No. 3,295,950, assigned to the assignee of the present invention. Subsequently, certain improvements in his methods were developed and reported in U.S. Pat. No. 3,342,577, Blouin et al., Sept. 19, 1967, also assigned to the assignee of the present invention. More recently, Blouin, in U.S. Pat. No. 4,587,358, May 6, 1986, assigned to the assignee of the present invention, has taught the use of, in combination with urea, calcium lignosulfonate (or other metal or ammonium lignosulfonates), homogeneously incorporated therewith and therein, as a vastly improved conditioning material for imparting to the resulting urea both superior anticaking and nonfriable characteristics.

It is verily believed that to those skilled in this art, who study the disclosure of the present invention, it will be appreciated that the practice of same overcomes a great multiplicity of the limitations and disadvangtages of the various methods and/or means of the type presently found in the prior art and that the present invention results in a new, novel, and unique combination of certain selected features of the advances in the art set forth by Blouin supra, albeit with wholly unexpected results. Accordingly, for purposes of teaching, disclosing, and claiming the instant invention, the teachings and disclosures, of U.S. Pat. Nos. 3,295,950, 3,342,577, and 4,587,358 supra are herewith and hereby incorporated herein by means of reference thereto. Also, for purposes of incorporation into the disclosure of the present invention teachings relating to a standard testing procedure to determine the 7-day dissolution rate reference is hereby made to the general description of the dissolution rate procedure contained in U.S. Pat. No. 3,903,333, Shirley et al., Sept. 2, 1975, assigned to the assignee of the present invention.

SUMMARY OF THE INVENTION

It has been noted that numerous prior art investigtors have discovered, taught, and disclosed methods and/or means which utilize in one way or another a number of approaches for applying coatings to various fertilizer materials in general and coatings of sulfur to urea in particular, for purposes of achieving controlled dissolution rates in the resulting product. More specifically, Blouin in U.S. Pat. No. 4,587,358 supra, has found that and taught the use of, in combination with urea, calcium lignosulfonate (or other metal or ammonium lignosulfonates), homogeneously incorporated therewith and therein, as a vastly improved conditioning material for imparting to the resulting urea particles both superior anticaking and nonfriable characteristics. The instant invention relates to an improved technqiue, including methods and means, and is based at least in part on our discovery that quite unexpectedly, urea containing calcium lignosulfonate (hereinafter referred to as Urea LS TM *) as in the manner of U.S. Pat. No. 4,587,358 supra, in addition to exhibiting the vastly improved and superior properties attributal thereto by Blouin, also exhibits very substantially reduced dissolution rates when subsequently coated with sulfur. The gist underlying the concept comprising the principal embodiment of the instant invention is that the process of incorporation of lignosulfonate in urea, as in U.S. Pat. No. 4,587,358 supra, also quite unexpectedly results in the production of a substantially superior substrate for subsequent sulfur coating than does urea conditioned in the conventional manner with formaldehyde.

*Urea LS TM is a trademark of the Tennessee Valley Authority.

OBJECTS OF THE INVENTION

It is therefore a principal object of the present invention to provide new methods and/or means eminently suitable for producing sulfur-coated urea such that substantially smaller amounts of sulfur (about two-thirds) is required to achieve similar substrate dissolution rates as compared to those achieved with presently available state of the art processes.

Another principal object of the present invention is to provide new methods and/or means eminently suitable for producing sulfur-coated urea such that substantially smaller amounts of sulfur (about two-thirds) is required to achieve presently commercial practiced substrate dissolution rates of about 25 percent in 7 days.

Still another principal object of the present invention is to provide new methods and/or means eminently suitable for producing sulfur-coated urea such that present commercially-practiced levels of sulfur coating weight may be utilized thereon to produce products exhibiting substantially lower dissolution rates, e.g., as low as about 10 percent in 7 days.

A still further principal object of the present invention is to provide new methods and/or means eminently suitable for producing sulfur-coated urea, such that present commercially-practiced levels of sulfur coating weight may be utilized thereon to produce products exhibiting substantially lower dissolution rates, e.g., about 10 percent in 7 days, and further exhibit the most desirable characteristic that such products can be subjected to considerably more mechanical handling, which tends to damage the sulfur shell thereon, than can be products produced by prior-art processes, without resultant degradation of the dissolution rate thereof above about 25 percent in 7 days.

Still further and more general objects and advantages of the present invention will appear from the more detailed description set forth below, it being understood, however, that this more detailed description is given by way of illustration and explanation only, and not necessarily by way of limitation since various changes therein may be made by those skilled in the art without departing from the true spirit and scope of the present invention.

BRIEF DESCRIPTION OF THE DRAWINGS

The present invention will be better understood from a consideration of the following description taken in connection with the accompanying drawings in which.

DETAILED DESCRIPTION OF THE DRAWINGS

Referring first and now more specifically to FIG. 2, for the sake of clarity and a better understanding of the applicability of the graphical illustrations therein, a more detailed description of same is given below in combination with the description of Example IV.

Figure 1:
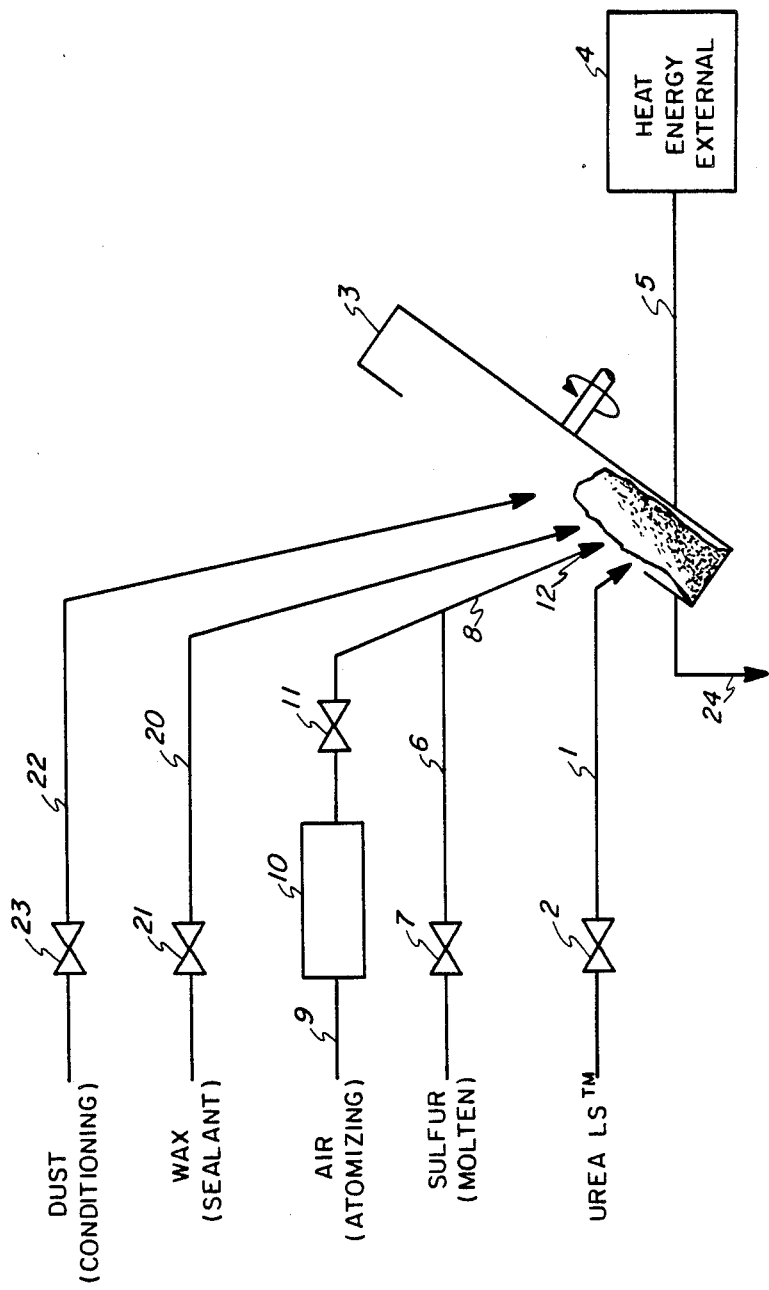
FIG. 1 represents a flowsheet illustrating the preferred embodiment of the present invention and generally depicts methods and means utilized in the effecting thereof.

Referring now more specifically to FIG. 1, therein is shown in schematic form the general layout for the practice of various embodiments of the instant invention including the concepts of both the batch process procedure that we used in testing of the instant invention and the continuous process which would be the preferred embodiment of said invention. Reference is now made specifically to the batch tests used in discovering concepts underlying the gist of the instant invention wherein the operation was carried out utilizing, as the coating device, a granulator of the pan type with lifting flights. Urea LS TM granules from a source not shown are charged into rotating inclined pan granulating (coating) means 3. As described infra, operation of the initial embodiment of the instant invention was conducted on a batch basis. As described in other portions of this disclosure, operation of the instant process requires the application of external heat energy applied to the pan granulator coating device. Accordingly, external heat energy from source 4 is directed via line 5 to pan granulating (coating) means 3, it being understood, of course, that line 5 can represent any number of methods and or means for applying same through convection, conduction, and/or radiation. As depicted the particulate material in pan granulating (coating) means 3 is substantially disposed about the tilted planar surface of the pan by action of the lifting flights and gravitational force. Concurrently, or subsequently, molten sulfur from a source not shown is fed via line 6 and means for control of flow 7 to line 8 wherein it is joined with air from a source not shown fed via line 9 through air heater means 10 and means for control of flow 11 and introduced into pan granulating (coating) means 3. The molten sulfur along with heated atomizing air in line 8 is normally sprayed onto the tumbling bed of particulate material maintained in pan granulating (coating) means 3 through introduction of same into pneumatic atomizing means 12 which means can be, for example, one or more pneumatic nozzles. In the usual operation of an inclined rotating pan granulator such as granulating (coating) means 3, the modus operandi is to arrange for introduction of the materials thereinto generally into an area through which most of the particulates are tumbling and accordingly as depicted the molten sulfur is directed to the general area of the pan planar surface. In operation of the instant invention in the batch mode, after introduction of the said Urea LS TM and said molten sulfur-heated air admixture to said granulating (coating) means 3 and sufficient time has elasped to process the combined materials therein, sealing wax from a source not shown is fed via line 20 and means for control of flow 21 into granulating (coating) means 3 and generally onto the bed of rolling resulting particulate material therein. In like manner, usually after application of said sealing wax, conditioning dust from a source not shown is fed via line 22 and means for control of flow 23 onto the bed of tumbling discrete particulate material in said pan granulating (coating) means 3. Again, after sufficient time has elasped to ensure complete coating and conditioning of the resulting tumbling particulate material processed in pan granulating (coating) means 3 it is withdrawn via line 24 as product of the instant invention. As described infra, in the conduct of various tests carried out for purposes of determining the critical features and operating parameters of the process comprising the instant invention, some of the finished sulfur-coated urea product withdrawn via line 24 was subjected to standard testing to determine the 7-day dissolution rate. The results of such testing revealed that only about two-thirds as much sulfur was required to achieve a dissolution rate of about 25 percent in 7 days as that required by prior-art processes. Alternatively, it was discovered that present commercially-practiced levels of sulfur coating could be added to pan granulating (coating) means 3 to produce a product having a much lower dissolution rate than is currently available from practice of present day state-of-the-art technology. In the initial embodiment of the instant invention the operation of pan granulating (coating) means 3 is conducted as a batch operation; although, of course, it might be practiced, if desired, on a continuous basis and using a drum-type granulator instead of a pan. The results achieved with the pan granulator batch tests as described in the examples infra may readily and easily be obtained by those skilled in the art through use of another type granulator, such as a drum, and continuous processing. Referring again to FIG. 1, said continuous process would involve feeding Urea LS TM granules continuously via line 1 and means for control of flow 2 into coating device 3. Molten sulfur, sealing wax, and conditioning dust would be fed continuously into respective compartments of coating device 3 or into separate coating devices as in U.S. Pat. No. 3,342,577 supra. Coated product would be withdrawn continuously.

DESCRIPTION OF THE PREFERRED EMBODIMENTS

In carrying out the objects of our invention in one embodiment thereof, we have discovered that urea, when conditioned with calcium lignosulfonate, or for that matter other of the lignosulfonate materials disclosed in Blouin U.S. Pat. No. 4,587,358, supra, provides a substantially superior substrate for the application thereupon of coatings of sulfur and to thereby achieve vastly enhanced characteristics relating to improved controlled dissolution rates.

In practicing the operation of the instant invention in one form thereof, granular Urea LS TM of particle size −6+8 mesh Tyler, prepared by any suitable method, including those taught by Blouin just supra, is charged, batchwise, into any suitable processing means, such as for example, a pan granulator coating device which pan granulator preferably may be heated by application thereto of externally supplied heat energy. Molten sulfur is sprayed onto the tumbling bed through a pneumatic nozzle. When the sulfur application is completed, a wax sealing mixture is poured onto the tumbling bed, then conditioning clay is dusted onto the tumbling bed. The resulting finished sulfur-coated urea is subjected to standard testing procedures to determine the 7-day dissolution rate. See U.S. Pat. No. 3,903,333, Shirley et al. supra for details re such standard testing procedure.

The results of such testing reveal that only about two-thirds as much sulfur is required (i.e., about 10 percent as opposed to about 16 percent for that required by prior art processes) in order to achieve a dissolution rate of about 25 percent in 7 days. Alternatively, present commercially-practiced levels of sulfur coating, i.e., about 16 percent, by weight, based on the weight of coated product, can be added to produce a product having a much lower dissolution rate. It will be appreciated by those skilled in the art that particle sizes other than −6+8 mesh may be coated to obtain the improved product of the instant invention, and that coating of coarser substrate will require proportionately less sulfur while finer substrate will require more sulfur.

EXAMPLES

In order that those skilled in the art may better understand how the present invention can be practiced, the following examples are given by way of illustration only and not necessarily by way of limitation, since numerous variations thereof will occur and will undoubtedly be made by those skilled in the art without substantially departing from the true and ntended scope of the instant invention herein taught and disclosed.

EXAMPLE I

In the pursuit of further information for the purpose of more clearly defining the parameters affecting the practice of the instant invention the investigations herein were made to determine if indeed, that for a given dissolution rate, urea made with calcium lignosulfonate requires less total coating than urea made with formaldehyde. In the tests comprising this example, the sulfur coating was performed in batch-type equipment. This batch sulfur-coating equipment consisted of a 16-inch diameter by 6-inch deep rotating pan equipped with lifting flights, a sulfur melter pressured with nitrogen gas and a pneumatic spray nozzle. The sulfur melter, sulfur line, nozzle, and pneumatic line were heat traced for temperature control. The rotating pan was heated externally.

The following procedure was used to sulfur coat these products. The −6+8 mesh substrate was placed into the pan, which pan was rotated at approximately 36 r/min and heated to 160° F. The molten sulfur (300° F.) was sprayed onto the tumbling bed of substrate maintained in said pan to produce a sulfur coating in the range of 15 to 16 percent, by weight.

To seal the resulting sulfur-coated material in the pan the substrate was heated to 175° F. and waxed by slowly pouring thereon 3 percent, by weight, and based on the total weight of urea LS TM and sulfur, of a mixture of 30 percent AC ®$^a$-6 polyethylene and 70 percent Shellflex ®$^b$ 790 brightstock oil that had been previously heated to 250° F. After applying the sealant, the tumbling bed was cooled to 100° F. and conditioned with 2 precent, by weight, of diatomaceous earth.

$^b$AC ® is a registered trademark of Allied Signal Corporation.

[b]Shellflex ® is a registered trademark of Shell Chemical Company.

Coating weights, 7-day dissolution rates, percentages of formaldehyde or calcium lignosulfonate (CaLS), and percent nitrogen are listed in Table I, below.

TABLE I

| Sample No. | Substrate wt % HCHO | Substrate wt % CaLS | Sealed total coating wt % | % N | 7-day dissolution rate, % |
|---|---|---|---|---|---|
| 1 | 0 | 0.84 | 21.7 | 35.6 | 5.6 |
| 2 | 0 | 0.86 | 20.9 | 36.0 | 9.5 |
| 3 | 0.39 | 0 | 21.1 | 36.2 | 25.6 |

Referring now to the results illustrated in Table I supra, it will be appreciated that the dissolution rate of urea made with formaldehyde is in the range that is expected with a coating weight of 20 to 21 percent. The dissolution rates of the products made with calcium lignosulfonate were significantly lower than was expected with the same coating weight. The dissolution rate results indicate that urea made with calcium lignosulfonate requires significantly less total coating than urea made with formaldehyde.

EXAMPLE II

For the purposes of the investigations reflected by this example and performed in the pursuit of further definition of the parameters referred to in Example I, supra, this portion of our investigation was based on the proposition that perhaps the level of addition of the lignosulfonate may be a factor of some significance. Accordingly, in order to further investigate portions of the discovery determined in Example I supra, sulfur-coated products were prepared from −6+8 mesh substrate at three levels of sulfur coating with three different levels of calcium lignosulfonate addition thereto. These products were sealed with 3 percent, by weight, of a mixture of 30 percent AC ®-6 polyethylene and 70 percent Shellflex ® 790 brightstock oil, and conditioned with 2 percent, by weight, diatomaceous earth. Also prepared in the tests comprising this example were samples of sulfur-only coated products made (1) with no sealant, (2) at three weight levels of sulfur coating, and (3) at three concentrations of calcium lignosulfonate.

For this series of tests, a full factorial design of experiments with three center points was chosen so that statistical analysis could be performed on the results. Coating weights, 7-day dissolution rates, nitrogen contents, and addition levels are presented in Table II infra. The equipment and procedure used for each test in each series is the same as previously described in Example I supra.

A least squares multiple regression utilizing the data obtained herein indicated that when using urea containing 0.5 to 1.0 percent calcium lignosulfonate, a 7-day dissolution rate of 25 percent can be obtained by applying a total coating of sulfur, wax, and diatomaceous earth of about 15.6 percent (10.6 percent sulfur). Varying the level of calcium lignosulfonate had practically no effect on the 7-day dissolution rate in the range tested.

TABLE II

| Test No. | Desired wt % | Coating weights Actual wt % | | | | CaLS, wt % | % N | 7-day dissolution rate, % |
|---|---|---|---|---|---|---|---|---|
| | | S | Sealant | Cond | Total | | | |
| Urea LS TM and Sulfur + Sealant | | | | | | | | |
| 1 | 8 | 3.7 | 3.0 | 2.0 | 8.7 | 0.53 | 42.0 | 88.2 |
| 2 | 21 | 15.4 | 3.0 | 2.0 | 20.4 | 0.53 | 36.7 | 13.2 |
| 3 | 8 | 3.2 | 3.0 | 2.0 | 8.2 | 1.01 | 41.6 | 85.8 |
| 4 | 21 | 14.4 | 3.0 | 2.0 | 19.4 | 1.01 | 36.5 | 16.5 |
| 5 | 14.5 | 8.6 | 3.0 | 2.0 | 13.6 | 0.76 | 39.4 | 35.3 |
| 6 | 14.5 | 8.6 | 3.0 | 2.0 | 13.6 | 0.76 | 39.4 | 32.3 |
| 7 | 14.5 | 9.0 | 3.0 | 2.0 | 14.0 | 0.76 | 39.3 | 39.7 |
| Urea LS TM and Sulfur-only products | | | | | | | | |
| 8 | 5 | — | — | — | 5 | 0.53 | — | 98.0 |
| 9 | 25 | — | — | — | 24.4 | 0.53 | — | 53.5 |
| 10 | 5 | — | — | — | 5.8 | 1.01 | — | 95.3 |
| 11 | 25 | — | — | — | 24.6 | 1.01 | — | 47.9 |
| 12 | 15 | — | — | — | 13.4 | 0.76 | — | 90.9 |
| 13 | 15 | — | — | — | 16.4 | 0.76 | — | 83.6 |
| 14 | 15 | — | — | — | 14.6 | 0.76 | — | 89.8 |

Referring now more specifically to Table II supra, it may be seen that the influence of the lignosulfonate level appears to be of little importance. For the sulfur-only coated products with no waxing or conditioner, a multiple regression was performed with the data, and for these tests using sulfur only, the calcium lignosulfonate level did have a slight effect on dissolution rates. However, since the dissolution rates were so high for all the tests herein performed, the steps of waxing and conditioning are strongly recommended. It may be fair to assume that, as a result of the tests comprising this example, no advantage is seen for that variation of the process wherein sulfur-only coating procedures are pursued.

EXAMPLE III

Continuing the comparison of sulfur-coated products made from −6+8 mesh Urea LS TM substrate, with sulfur-coated product made from −6+8 mesh urea conditioned with formaldehyde, as suggested in Example I supra, an additional tabulation is presented for purposes of expanded clarity. Examples of sulfur-coated Urea LS TM (containing calcium lignosulfonate) at a total coating level of about 21 percent (about 16 percent sulfur) are presented for comparison with a typical sample of sulfur-coated white urea (containing formaldehyde) at the same coating weight. The test data are shown in Table III infra.

TABLE III

| Sample No. | Substrate wt % HCHO | Substrate wt % CaLS | Sealed total coating wt % | % N | 7 day dissolution rate, % |
|---|---|---|---|---|---|
| 1[a] | 0.39 | — | 21.1 | 36.2 | 25.6 |
| 2[b] | — | 0.53 | 20.4 | 36.7 | 13.2 |
| 3[c] | — | 0.86 | 20.9 | 36.0 | 9.5 |
| 4 | — | 1.01 | 21.4 | 35.6 | 10.6 |

TABLE III-continued

| Sample No. | Substrate wt % HCHO | Substrate wt % CaLS | Sealed total coating wt % | % N | 7 day dissolution rate, % |
|---|---|---|---|---|---|
| 5[d] | — | 0.84 | 21.7 | 35.6 | 5.6 |

[a] Number 3 in Example I.
[b] Number 2 in Example II.
[c] Number 2 in Example I.
[d] Number 1 in Example I.

Referring now more specifically to Table III supra, and the data presented therein, it may be appreciated by those skilled in this art that the mere presence of calcium lignosulfonate in the substrate is more significant than the addition level, at least within the limits tested. It will also be appreciated that there is a noticeable reduction in the dissolution rate at each of the levels of calcium lignosulfonate addition tested, when compared with dissolution rates of products wherein the urea substrate contains formaldehyde rather than lignosulfonate.

EXAMPLE IV

In the conduct of this example, five tests were made using −6+8 mesh white urea (containing formaldehyde) coated at various levels of sulfur plus sealant and conditioner dust in order to demonstrate the effect of coating weight on the 7-day dissolution rate. The results from these tests are shown in Table IV below. Also assembled in Table IV below are the results obtained with −6+8 mesh Urea LS TM, coated with sulfur, sealant, and dust, in the range of 0.75 to 1.01 percent calcium lignosulfonate.

TABLE IV

| Additive Type | wt % | Total coating, wt % | 7-day dissolution rate, % |
|---|---|---|---|
| *Urea plus formaldehyde* | | | |
| HCOH | 0.4 | 12.6 | 69.7 |
| HCOH | 0.4 | 14.8 | 47.7 |
| HCOH | 0.4 | 16.3 | 31.8 |
| HCOH | 0.4 | 21.1 | 25.6 |
| HCOH | 0.4 | 25.5 | 15.9 |
| *Urea plus calcium lignosulfonate (Urea LS TM)* | | | |
| CaLS | 0.75 | 8.8 | 69.7 |
| CaLS | 0.75 | 13.6 | 37.2 |
| CaLS | 0.75 | 13.6 | 35.3 |
| CaLS | 0.75 | 13.6 | 32.3 |
| CaLS | 0.75 | 14.0 | 39.7 |
| CaLS | 0.75 | 14.6 | 22.6 |
| CaLS | 0.84 | 21.7 | 5.6 |
| CaLS | 0.86 | 20.9 | 9.5 |
| CaLS | 1.01 | 7.2 | 81.2 |
| CaLS | 1.01 | 8.2 | 85.8 |
| CaLS | 1.01 | 12.6 | 53.6 |
| CaLS | 1.01 | 13.0 | 30.2 |
| CaLS | 1.01 | 19.4 | 16.5 |
| CaLS | 1.01 | 21.4 | 10.6 |

Figure 2:
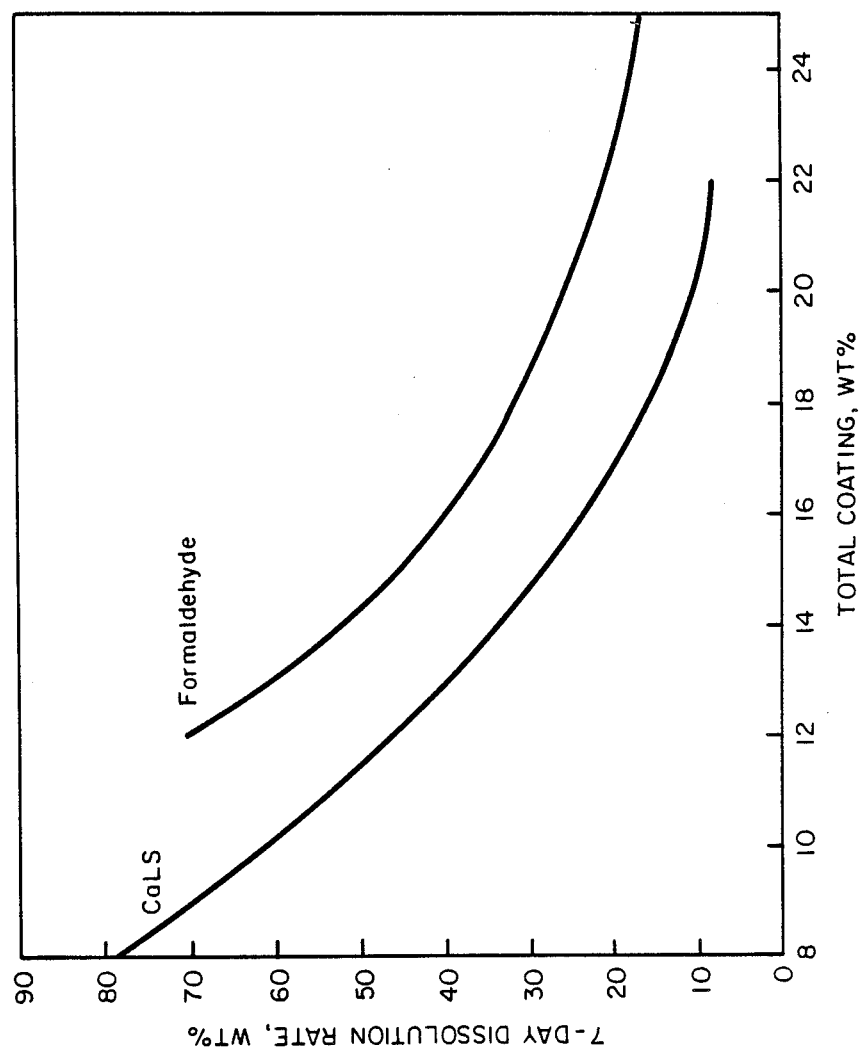
FIG. 2 graphically illustrates, by means of using a comparison of urea containing formaldehyde with Urea LS TM, that sulfur-coated Urea LS TM requires substantially smaller amounts of total coating weight to achieve the desired same 7-day dissolution rate than does urea conditioned with formaldehyde.

Referring now more specifically to FIG. 2 and using the data in Table IV supra, a comparison of urea containing formaldehyde with Urea LS TM is graphically illustrated. It may be appreciated by those skilled in this art that the depictions in FIG. 2 clearly illustrate that sulfur-coated Urea LS TM requires less total coating weight to achieve the same 7-day dissolution rate than does urea conditioned with formaldehyde. By way of explanation, the curves in the FIG. 2 were developed by computer analysis of the data in Table IV supra, and are based on equations which best fit the data. These equations are:

For white urea:

$$\text{Dissolution rate} = 9528 W^{-1.973}$$

For Urea LS TM:

$$\text{Dissolution rate} = 175 - 14.5 W + 0.315 W^2$$

In each equation W is the total coating weight of sulfur, sealant, and conditioner dust expressed as percent, by weight, of the product.

INVENTION PARAMETERS

After sifting and winnowing through the data supra, as well as other results and operations of our new, novel, and improved technique, including methods and means for the effecting thereof, the operating variables, including the acceptable and preferred conditions for carrying out our invention are summarized below:

| Variables | Operating Limits | Preferred Limits | Most Preferred Limits |
|---|---|---|---|
| Lignosulfonate, wt. % in urea | 0.1–5.0 | 0.4–1.0 | 0.4–0.8 |
| Sulfur, wt. % of coated product | 5–30 | 5–20 | 10–16 |
| Sealant, wt. % of coated product | 1–5 | 2–4 | 3 |
| Conditioning dust, wt. % of coated product | 1–4 | 1–3 | 2 |
| Molten sulfur temperature, °F. | 285–320 | 290–310 | 300 |
| Bed temperature in coating divice, °F. during sulfur addition | 150–180 | 150–175 | 160 |
| Sealant temp. °F. | 230–275 | 240–260 | 250 |
| Bed temperature in coating divice, °F. during sealant addition | 150–185 | 160–180 | 175 |
| Bed temperature in coating device, °F. during dust addition | 80–120 | 90–110 | 100 |
| Sealant composition | | | |
| Wt. % Shellflex ® 790 brightstock oil | 20–80 | 60–80 | 70 |
| Wt. % AC ®-6 polyethylene | 80–20 | 50–20 | 30 |

While we have shown and described particular embodiments of our invention, modifications and variations thereof will occur to those skilled in the art. We wish it to be understood therefore that the appended claims are intended to cover such modifications and variations which are within the true scope and spirit of our invention.

What we claim as new and desire to secure by Letters Patent of the United States is:

1. An improved product of substantially enhanced relatively low aqueous media dissolution rate and/or relatively high impact resistance resulting from the coating of a substrate with from about 5 percent to about 30 percent, by weight, based upon the weight of coated product, of sulfur, said substrate consisting essentially of a substantially homogeneous admixture of urea and a water-soluble metal or ammonium salt of lignosulfonic acid, the quantity of said salt ranging from about 0.1 percent to about 5 percent, by weight, of said admixture.

2. The improved product of claim 1 wherein said salt ranges from about 0.4 percent to about 1.0 percent, by weight, of said admixture.

3. The improved product of claim 2 wherein said salt ranges from about 0.4 percent to about 0.8 percent, by weight, of said admixture.

4. The improved product of claim 2 wherein said sulfur coating ranges from about 5 percent to about 20 percent, by weight, based upon the weight of coated product.

5. The improved product of claim 1 wherein said substantially enhanced relatively low aqueous media dissolution rate ranges from about 5 percent to about 25 percent in 7 days.

6. The improved product of claim 1 wherein said substantially enhanced relatively low aqueous media dissolution rate ranges from about 10 percent to about 20 percent in 7 days.

7. The improved product of claim 1 wherein said substantially enhanced relatively low aqueous media dissolution rate ranges from about 10 percent to about 15 percent in 7 days.

8. The improved product of claim 1 wherein said substantially enhanced relatively low aqueous media dissolution rate is about 10 percent in 7 days.

9. An improved method for imparting to sulfur-coated particulate urea fertilizer the properties of substantially enhanced relatively low aqueous media dissolution rate and/or relatively high impact resistance, which improved method comprises the steps of:

(1) mixing water-soluble metal or ammonium salts of lignosulfonic acid or both into an essentially anhydrous molten melt of urea, or highly concentrated urea synthesis solutions subsequently utilized to produce said melt, until a homogenous mixture thereof results;

(2) converting said melt resulting in step (1) supra into particulate form;

(3) subsequently coating the surfaces of the particulate urea resulting in step (2) supra with from about 5 to about 30 percent, by weight, based on the weight of said resulting urea, of molten sulfur; and, (4) converting said resulting molten sulfur-coated particulate urea, resulting in step (3) supra, into particulate form;

said improved method characterized by the fact that the resulting individual particles in step (2) supra contain from about 0.1 to about 5 percent, by weight, based on the weight of said urea, of said lignosulfonate and said improved method being further characterized by the fact that said weight percent sulfur coating and said substantially enhanced relatively low aqueous media dissolution rate are in direct and inversely proportional relationship to one another through the range of sulfur coating of from about 5 percent to about 16 percent and through the range of 7 day dissolution rate of from about 25 percent to about 10 percent.

10. The improved method of claim 9 wherein the amount of lignosulfonate admixed with said anhydrous molten melt or said synthesis solution utilized for the production thereof is utilized in amounts ranging from about 0.1 percent to about 1.0 percent, by weight, of said lignosulfonate in the particulate urea resulting in step (2) thereof, wherein said sulfur coating resulting in the product therefrom ranges from about 10 percent to about 16 percent, and wherein said substantially enhanced relatively low aqueous media 7-day dissolution rate ranges from about 20 percent to about 10 percent.

11. The improved method of claim 10 wherein the amount of lignosulfonate admixed with said anhydrous molten melt, or said synthesis solution utilized for the production thereof, is utilized in amounts ranging from about 0.4 percent to about 0.8 percent, by weight, of said lignosulfonate in the particulate urea resulting in step (2) thereof, wherein said sulfur coating resulting in the product therefrom ranges from about 14 percent to about 16 percent, and wherein said substantially enhanced relatively low aqueous media 7-day dissolution rate ranges from about 15 percent to about 10 percent.

12. The improved method of claim 9 wherein said metal lignosulfonate is calcium lignosulfonate.

13. The improved method of claim 10 wherein said metal lignosulfonate is calcium lignosulfonate.

14. The improved method of claim 11 wherein said metal lignosulfonate is calcium lignosulfonate.

15. The improved product of claim 1 resulting from the coating of said substrate sulfur coating with a sealant comprising polyethylene, brightstock oil, and mixtures thereof and further resulting from coating the resulting sealed sulfur coating with conditioner dust.

16. The improved method of claim 9 wherein a sealant comprising polyethylene, brightstock oil, and mixtures thereof is applied to said sulfur coating and the resulting sealed sulfur coating is subsequently coated with conditioner dust.

* * * * *